US012801753B2

(12) United States Patent
DiValentin et al.

(10) Patent No.: US 12,801,753 B2
(45) Date of Patent: Nov. 17, 2026

(54) OPEN-SOURCE VULNERABILITY DETECTION AND IMPACT ASSESSMENTS

(71) Applicant: Accenture Global Solutions Limited, Dublin (IE)

(72) Inventors: Louis DiValentin, Arlington, VA (US); Bai Chien Kao, Amherst, MA (US); Mário Lauande Lacroix, Toronto (CA)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 180 days.

(21) Appl. No.: 18/622,208

(22) Filed: Mar. 29, 2024

(65) Prior Publication Data

US 2024/0330484 A1 Oct. 3, 2024

Related U.S. Application Data

(60) Provisional application No. 63/493,116, filed on Mar. 30, 2023.

(51) Int. Cl.
*G06F 21/57* (2013.01)
*G06F 8/65* (2018.01)

(52) U.S. Cl.
CPC .............. *G06F 21/577* (2013.01); *G06F 8/65* (2013.01); *G06F 21/572* (2013.01); *G06F 2221/033* (2013.01)

(58) Field of Classification Search
CPC ........ G06F 21/577; G06F 21/572; G06F 8/65; G06F 2221/033
USPC ........................................................... 726/25
See application file for complete search history.

(56) References Cited

U.S. PATENT DOCUMENTS

| | | | | |
|---|---|---|---|---|
| 7,246,275 | B2 * | 7/2007 | Therrien | G06F 11/2038 714/6.23 |
| 11,023,586 | B2 * | 6/2021 | Bhatia | G06F 11/3688 |
| 11,093,321 | B1 * | 8/2021 | Zeavelou | G06F 11/0793 |
| 12,063,230 | B2 * | 8/2024 | Ali-Tolppa | H04L 41/16 |
| 12,314,403 | B2 * | 5/2025 | Wareus | G06F 8/36 |
| 2008/0189295 | A1 * | 8/2008 | Khedouri | G06F 16/1834 |

(Continued)

FOREIGN PATENT DOCUMENTS

CN 113868650 A * 12/2021 .......... G06F 18/253

OTHER PUBLICATIONS

CDDiff: Semantic Differencing for Class Diagrams Shahar Maoz?, Jan Oliver Ringert??, and Bernhard Rumpe pp. 230-254, Springer, 2011.*

(Continued)

*Primary Examiner* — Tauqir Hussain
(74) *Attorney, Agent, or Firm* — Mannava & Kang, P.C.

(57) ABSTRACT

A vulnerability detection and management system that identifies differences between a current version and updated version of code to determine potential impacts on a software application. The system continuously monitors a third-party library to detect whether new versions of a particular code are released. When such an event occurs, the system can automatically identify the changes and determine whether the differences are substantive. A vulnerability impact assessment can then be generated detailing the likely effects of any identified differences that can serve as guide to end-users when making decisions regarding updates and upgrades or migrations of their software.

10 Claims, 10 Drawing Sheets

(56) References Cited

U.S. PATENT DOCUMENTS

| | | | | |
|---|---|---|---|---|
| 2014/0324779 | A1* | 10/2014 | Forbes | G06F 16/27 707/634 |
| 2015/0205674 | A1* | 7/2015 | Schroth | G06F 11/1458 707/649 |
| 2016/0092526 | A1* | 3/2016 | Kothari | G06F 16/182 707/602 |
| 2016/0210361 | A1* | 7/2016 | Pistoia | G06F 16/986 |
| 2018/0336027 | A1* | 11/2018 | Narayanan | H04L 41/082 |
| 2020/0042712 | A1* | 2/2020 | Foo | G06F 21/577 |
| 2020/0104483 | A1* | 4/2020 | Brezo Fernández | G06F 21/128 |
| 2020/0242254 | A1* | 7/2020 | Velur | G06F 21/577 |
| 2022/0156053 | A1* | 5/2022 | Shaastry | G06F 8/71 |
| 2023/0252308 | A1* | 8/2023 | Roy | G06F 8/36 726/4 |
| 2023/0281045 | A1* | 9/2023 | Niu | G06N 3/0464 718/104 |
| 2024/0005184 | A1* | 1/2024 | Lubensky | G06N 10/60 |
| 2024/0184813 | A1* | 6/2024 | Rafferty | G06F 16/3329 |
| 2024/0345818 | A1* | 10/2024 | Baek | G06Q 20/102 |

OTHER PUBLICATIONS

Impact Assessment for Vulnerabilities in Open-Source Software Libraries Henrik Plate, Serena Elisa Ponta, Antonino Sabetta 978-1-4673-7532-0/15/$31.00 c 2015 IEEE.*

Implementing a high-efficiency similarity analysis approach for firmware code Wang, Yisen; Wang, Ruimin; Jing, Jing; Wang, Huanwei; Shi, Wenbo Digital Object Identifier: 10.1371/journal.pone.0245098 Electronic Publication Date: Jan. 12, 2021.*

* cited by examiner

OPEN-SOURCE VULNERABILITY DETECTION AND IMPACT ASSESSMENTS

CROSS-REFERENCE TO RELATED APPLICATION

This application is a continuation-in-part of and claims the benefit of U.S. Provisional Patent Application Ser. No. 63/493, 116 filed on Mar. 30, 2023 and titled "Automated Impact Detection", the disclosure of which is incorporated by reference herein in its entirety.

TECHNICAL FIELD

The present disclosure generally relates to automated impact detection. More specifically, the present disclosure generally relates to applying automated impact detection techniques to identify changes to a third-party library after an upgrade occurs. Additionally, the present disclosure generally relates to applying automated impact detection techniques to identify changes to a third-party library after a vulnerability patch occurs.

BACKGROUND

Maintaining up-to-date third-party libraries is tedious. Organizations often stick with old versions of dependencies to avoid rework, conflicts, and code breakage. For example, there may be limited visibility into whether package updates will break workflow. It requires time and effort to rerun deployment test cases to ensure new packages have not broken workflow. Also, test cases may not cover every scenario leading to unseen code breakage.

In a normal third-party library upgrade migration process, there may be four stages: Preparation, Compatibility, Field Test, and Trial Operation. Such stages must be performed manually by an analyst. In Preparation, the analyst runs an upgrade evaluation. In Compatibility, the analyst performs conflict resolution between different packages. In Field Test, the analyst performs function testing. In Trial Operation, the analyst performs pre-go-live testing on test branch. The analyst must perform a number of tasks manually, such as finding an updated library, importing the updated library, rebuilding and running an application for testing, rebuilding failures, unit testing failures, managing runtime errors, understanding the updated patch notes, manually fixing simple bugs, and issuing support tickets for complex errors to a development team.

Thus, it would be of great value to map dependencies in code bases to provide security and identify other issues. Nested dependencies in Software Bills of Material (SBOMs) create a real problem. Software Composition Analysis (SCA) is an automated process that identifies the open-source software in a codebase. SCA is typically performed to evaluate security, license compliance, and code quality. An SCA tool is usually found in a Static Application Security Toolkit (SAST) toolkit scanning package.

SCA may be performed as a part of a SAST platform update of new vulnerabilities at specified periods. Thus, organizations must wait to detect vulnerabilities in the next scheduled vulnerability assessment cycle. This can lead to delays and cost in a vulnerability detection lifecycle. SCA tools must wait for updating a new posted vulnerability until the next scan occurs. Likewise, scanning plans must wait for periodic scanning plans in cycles to occur. Also, SCA vendors often bill per scan, resulting in higher costs to reduce the time to identify vulnerabilities.

There is a need in the art for a system and method that addresses the shortcomings discussed above.

SUMMARY

The proposed systems and methods describe an automated service for monitoring open-source packages in order to determine whether a software application may be impacted by changes to third-party code. If a vulnerability within an open-source package is detected, the system can also locate the affected functions within the current code, including functions that are nested or dependent on the primary affected functions. The system provides users with a tool that actively and continuously monitors vulnerability feeds in real-time for each function and dependency to detect whether a vulnerability is released that is linked to those functions. If a vulnerability is released, the tool can, in response, automatically fetch information about that vulnerability and perform an analysis of the package to determine whether the vulnerability impacts the user's application, and if so, which specific portions of the application would be affected. In some embodiments, the system can further provide guidance to the user regarding steps that might be taken to close or resolve the vulnerability.

The proposed embodiments are effective in reducing downtime during migrations as well as limiting the impact of vulnerabilities during upgrades provided by third-party libraries. These features (among others described) are specific improvements in way that the underlying computer system operates and how the software application is maintained. In addition, the proposed systems and methods solve technical challenges with software development targeted for update or migration. The improvements facilitate a more efficient, accurate, consistent, and less costly progression of software code in an application. The improved functioning of the underlying computer hardware itself achieves further technical benefits. For example, the system avoids tedious and resource-draining periodic checks of vulnerability feeds that may occur belatedly after an impact has led to disruptions in the software. The system thereby accelerates the timeline for successful upgrades to an application, and reduces operational downtime.

In one aspect, a method of performing automated, tailored vulnerability impact assessments is disclosed. The method includes a first step of retrieving a targeted third-party library repository including both a patched version and a current version, and a second step of cloning the patched version and the current version into a local storage. A third step includes generating a first code database for the cloned patched version and a second code database for the cloned current version, and a fourth step includes comparing the first code database with the second code database to identify differences. In addition, a fifth step includes generating an impact result based on the identified differences, and a sixth step includes transmitting an alert to a user including information about affected functions for the patched version of the targeted third-party library repository, based on the impact result.

In another aspect, a non-transitory computer-readable medium storing software comprising instructions is disclosed. The instructions are executable by one or more computers which, upon such execution, cause the one or more computers to perform automated, tailored vulnerability impact assessments by: (1) retrieving a targeted third-party library repository including both a patched version and a current version; (2) cloning the patched version and the current version into a local storage; (3) generating a first code database for the cloned patched version and a second code database for the cloned current version; (4) comparing the first code database with the second code database to identify differences; (5) generating an impact result based on the identified differences; and (6) transmitting an alert to a user including information about affected functions for the patched version of the targeted third-party library repository, based on the impact result.

In another aspect, a system for performing automated, tailored vulnerability impact assessments is disclosed. The system includes a processor and machine-readable media including instructions which, when executed by the processor, cause the processor to: (1) retrieve a targeted third-party library repository including both a patched version and a current version; (2) clone the patched version and the current version into a local storage; (3) generate a first code database for the cloned patched version and a second code database for the cloned current version; (4) compare the first code database with the second code database to identify differences; (5) generate an impact result based on the identified differences; and (6) transmit an alert to a user including information about affected functions for the patched version of the targeted third-party library repository, based on the impact result.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
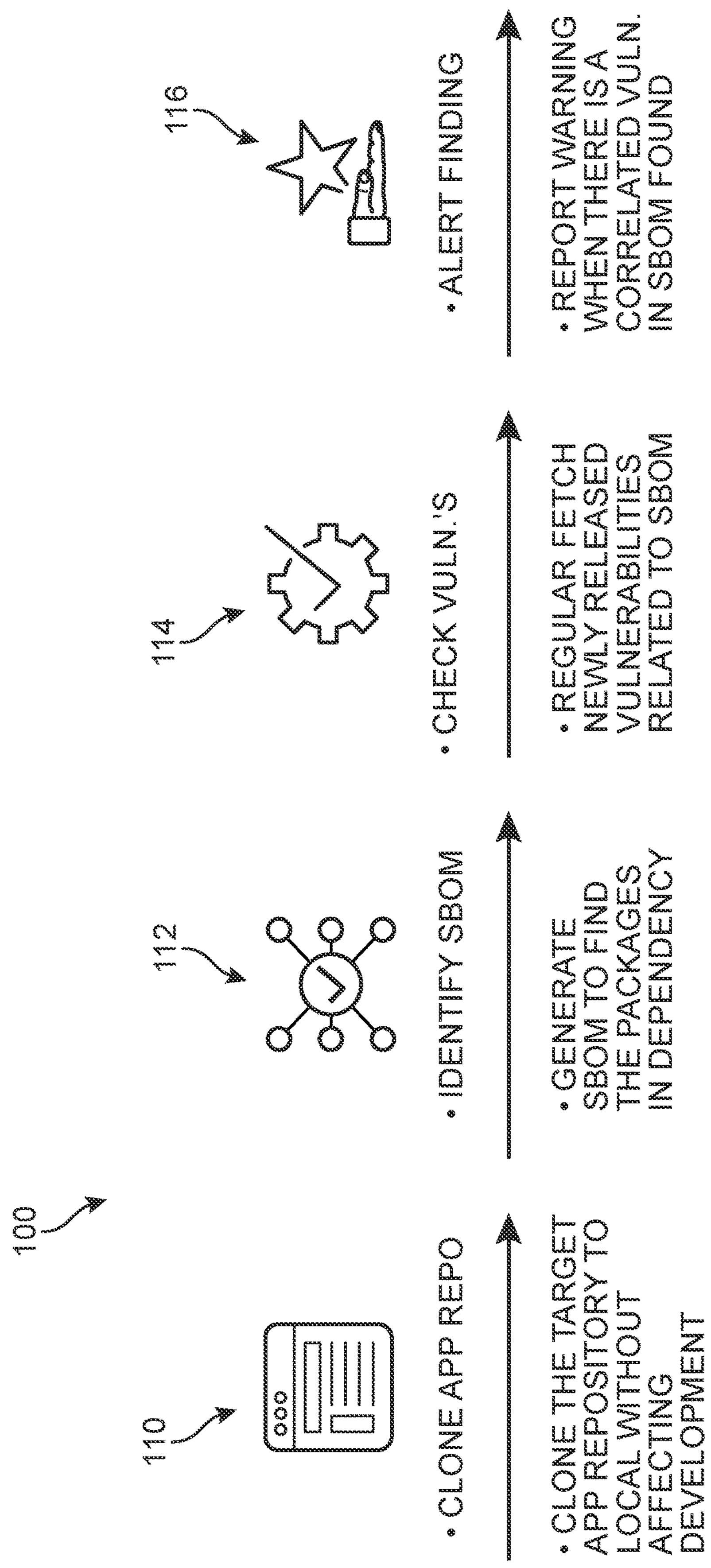
FIG. 1 is a diagram depicting a process for real-time monitoring of vulnerabilities, according to an embodiment.

A package impact detection system and method for detecting package impacts and generating tailored vulnerability impact assessments is disclosed. Software developers increasingly rely on open-source repositories and libraries to reduce workloads on development, as well as reduce risk in implementing complex capabilities like cryptography or memory management. While this improves code standardization and integration, it also expands the attack surface to software components no longer controlled by the organization.

The disclosed systems include provisions to automatically evaluate the impact of vulnerabilities identified by dependency vulnerability scanners in a software supply. For example, vulnerabilities in open-source dependencies can propagate into client source code and applications. Organizations need visibility and real-time monitoring to be alerted to and address these vulnerabilities when they appear. The proposed embodiments provide tools for automatic monitoring of open-source dependencies for vulnerabilities. In some embodiments, the system can prioritize the more vulnerable packages and functions within the code and additionally make recommendations for updates. An organization can then easily and in real-time monitor open-source vulnerability feeds and correlate those vulnerabilities to only the included packages in the source code, providing a unique view to each application. In different embodiments, if a difference between the current dependency and newly released fixed packages is detected—reflecting the changed functions within the dependency—the system can track the dataflow within the application source code to find all affected functions and output a report of the code usage for an analyst to address.

For example, packages may be updated to fix bugs and repair security risks. Alternatively, packages may be updated to improve performance of functions included in the packages. Organizations often maintain older versions of dependencies to avoid rework and conflicts. Conventionally, updating packages has required manually performing code analysis and running test cases. By offering an intelligent automated call path and dataflow analysis, embodiments streamline this process and identify the affected functions without need for manual oversight. By identifying the affected functions, it is possible for the system then to provide a metric of how much change occurs. Alternatively, by automatically identifying affected functions, a user who is performing an upgrade or who is fixing vulnerabilities can immediately assess which portions of a third-party library repository are affected by an upgrade process or by a vulnerability identification process. Thus, the end-user can more readily focus efforts on these affected portions, simplifying the remediation process and reducing the time and costs needed to secure or patch the vulnerabilities.

In addition, in some embodiments, the disclosed systems can automatically evaluate compatibility when migrating a third-party open-source library to an upgrade version. For example, to make the open-source dependencies in client application up-to-date organizations usually test and verify the compatibility of upgrade version to prevent the runtime issue. The proposed embodiments instead allow organizations to perform automated evaluations of the upgrade version of the open-source libraries/dependencies to detect the affected function usage in the context of the update. The affected usage and functions within their code can be automatically identified and, in some embodiments, the system can further generate intelligent recommendations for updates. As noted above, the tool can analyze the difference between the current dependency and newly released updated packages in order to identify the changed functions within the dependency. This information is then used to track the data flow within the application source code to find affected functions and usage for the developer to facilitate updating of the application. Rather than relying on an iterative manual approach that is performed only periodically and following a schedule, and can leave the application vulnerable in-between each cycle, the system can continuously monitor and track the dataflow to generate an automated impact assessment workflow for software dependency management and upgrade recommendations as well as associated costs.

For purposes of introduction, FIG. 1 depicts a diagram of a process 100 for real-time monitoring of vulnerabilities, according to an embodiment. In this example, the process 100 begins with operation 110 of cloning the application repository. Such an operation can involve cloning the target application repository to a local clone without affecting development. By cloning the target application repository, there is a working copy of the target application repository that can be studied to analyze vulnerabilities. For example, this step may be performed using a git clone operation.

Next, the process can continue with operation 112 of identifying the Software Bill of Materials (SBOM) which describes the software dependencies within a given application and/or the software supply chain. In such a manner, application dependencies can be enumerated in a SBOM. By generating the SBOM in operation 112, the SBOM identifies dependencies for a package. For example, this operation may be performed using the Syft command line tool. Then, the process can continue with operation 114 of checking vulnerabilities. This process of checking vulnerabilities in operation 114 involves a regular fetch of newly released vulnerabilities related to an SBOM as published by multiple feeds. The checking of vulnerabilities may occur by using an open-source vulnerability (OSV) Schema and/or an OSV API, or other standard API formats. In addition, in some embodiments, SBOM dependency versions can be correlated against existing and new Common Vulnerabilities and Exposures (CVEs).

As a general matter, OSV provides CVEs in a human and machine-readable data format developed in collaboration with open-source communities. OSV serves as an aggregator of vulnerability databases including, but not limited to the GitHub Advisory Database, PyPI Advisory Database, Go Vulnerability Database, Rust Advisory Database, Global Security Database, and OSS-Fuzz. There are APIs available to query for all known vulnerabilities. Typically, OSVs provide real-time updates of an aggregated CVE feed, that are updated whenever a vulnerability is published or modified. These feeds can include a summary, with a description of related CVE(s), any related Common Weakness Enumerations (CWE(s)), identification of the affected package and version range, and the affected functions.

As shown in FIG. 1, the process concludes with operation 116 of alert finding. During the alert finding in operation 116, the process can report a warning when the other parts of the process identify a correlated vulnerability in the SBOM (e.g., identifying the vulnerable function usage in the code). For example, such alert finding may provide the results as an e-mail or another form of message (e.g., SMS, in-app message, etc.). Such results allow a user to address the vulnerabilities as deemed appropriate. It should be understood that the proposed system can be configured to actively monitor the vulnerability database across multiple feeds to obtain information about new open-source vulnerabilities, without the need to wait for a scanning cycle to complete. The system can then automatically generate the query script to identify the vulnerability in the SBOM and the affected importing/usage in the code without waiting for a response from the vendor. In some embodiments, the system can also generate an impact assessment report that calculates the impact of the vulnerability on dataflow and objects for the application with respect to the version upgrade and other reworked areas, as will be discussed in greater detail below. In one example, a package upgrade assessment can be provided by the system that identifies differences in packages and each of their likely effects on the application if used for the upgrade.

Figure 2:
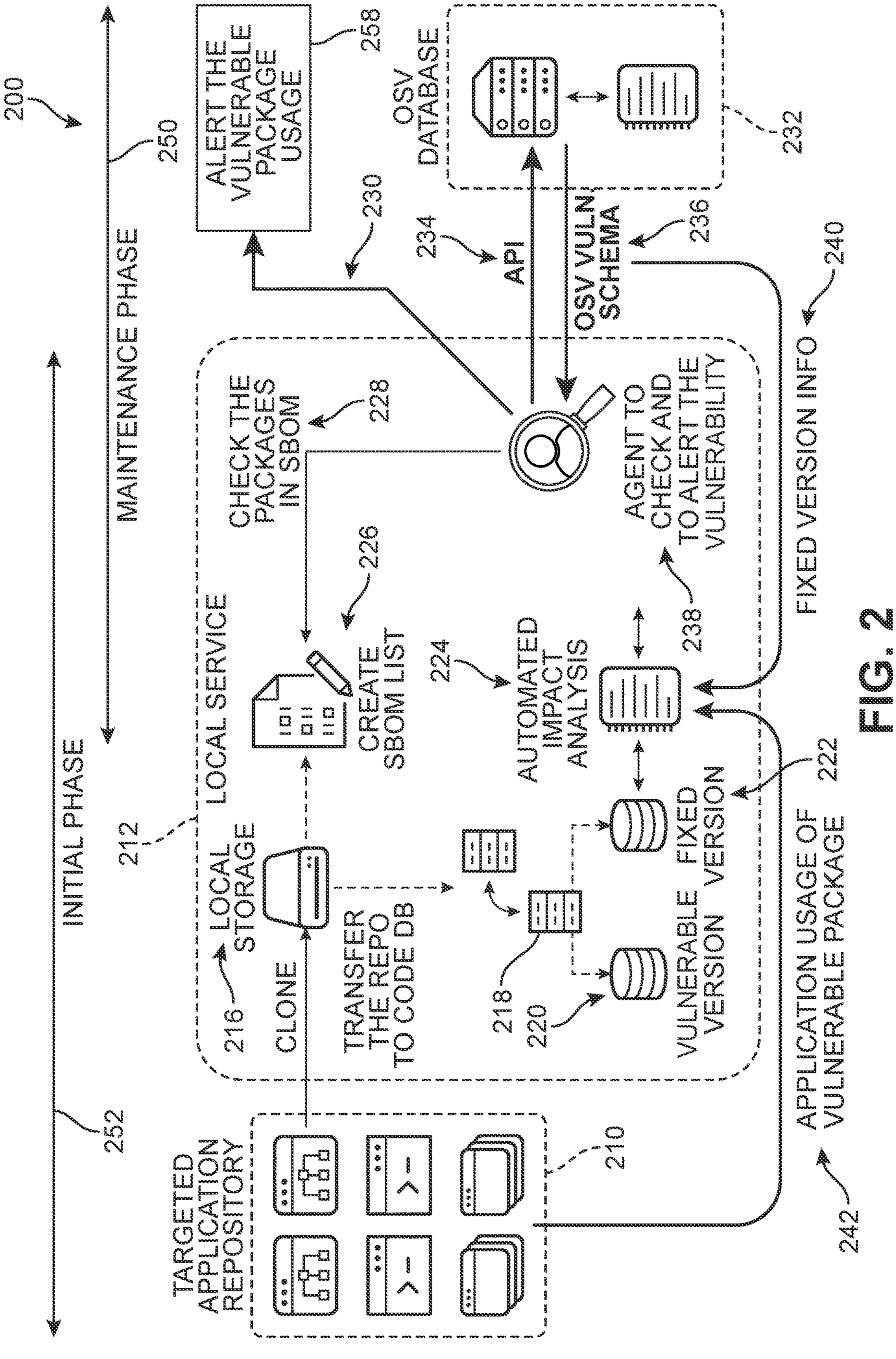
FIG. 2 is a diagram depicting a technical architecture of a system for updating vulnerabilities, according to an embodiment.

FIG. 2 is a diagram of a technical architecture of a system 200 for updating vulnerabilities, according to an embodiment. The system 200 of FIG. 2 includes a targeted application repository 210. In addition, the targeted application repository 210 interacts with a local service 212. Specifically, in some embodiments, the targeted application repository is cloned in operation 214 into local storage 216. The clone in local storage 216 of the targeted application repository 210 can be transferred into a code database 218, stored as a vulnerable version 220 and a fixed version 222. The vulnerable version 220 and the fixed version 222 can be processed per the approach discussed in greater detail below (e.g., see FIG. 3B), yielding an automated impact analysis 224.

In different embodiments, the information in local storage 216 is also processed to create a Software Bill of Materials (SBOM) list 226. The packages in the SBOM list 226 can be checked at operation 228. The results of the checking in operation 228 can be provided to an agent to check/evaluate and to generate an alert in case of a detected vulnerability in operation 238. For example, the agent may trigger an alert for the vulnerable package usage 258 in operation 230. The agent may also employ an Application Programming Interface (API) 234 to interact with an open-source vulnerability (OSV) database 232. In some embodiments, the OSV database 232 can provide an OSV vulnerability schema 236 to the agent.

In addition, in some embodiments, the OSV vulnerability schema 236 can provide fixed version information 240 for the automated impact analysis 224. The automated impact analysis 224 can also receive information about application usage of a vulnerable package 242 from the targeted application repository 210. Thus, in different embodiments, the process can be understood to comprise an initial phase 252 and a maintenance phase 250. In the initial phase 252 an original vulnerability assessment occurs. In the maintenance phase 250, the original vulnerability assessment is kept valid and up-to-date. Based on the interactions, the agent can also receive information from the automated impact analysis 224. In some embodiments, the received information also allows the agent to provide an alert of the vulnerable package usage 258.

Figure 3A:
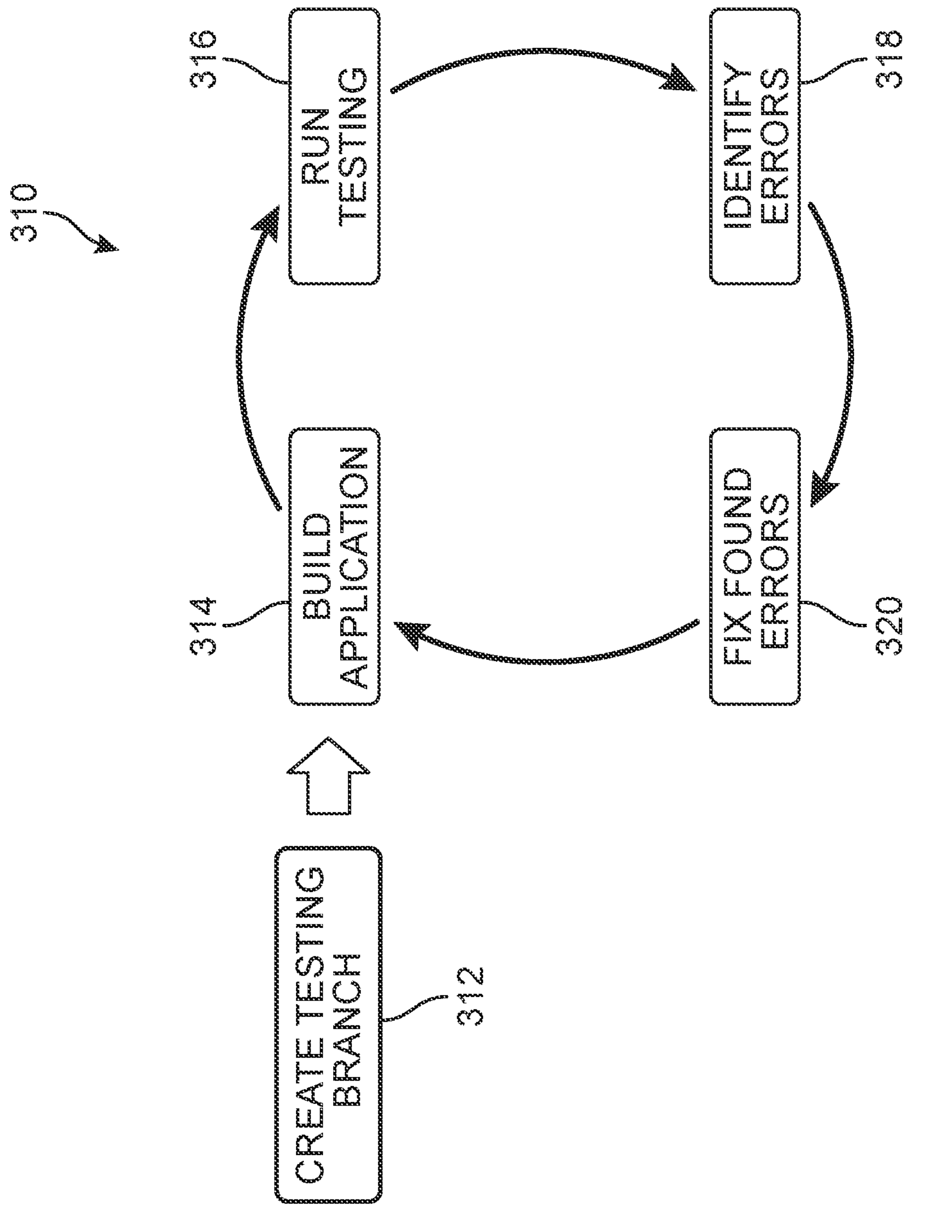
FIG. 3A shows a conventional approach to impact analysis.
Figure 3B:
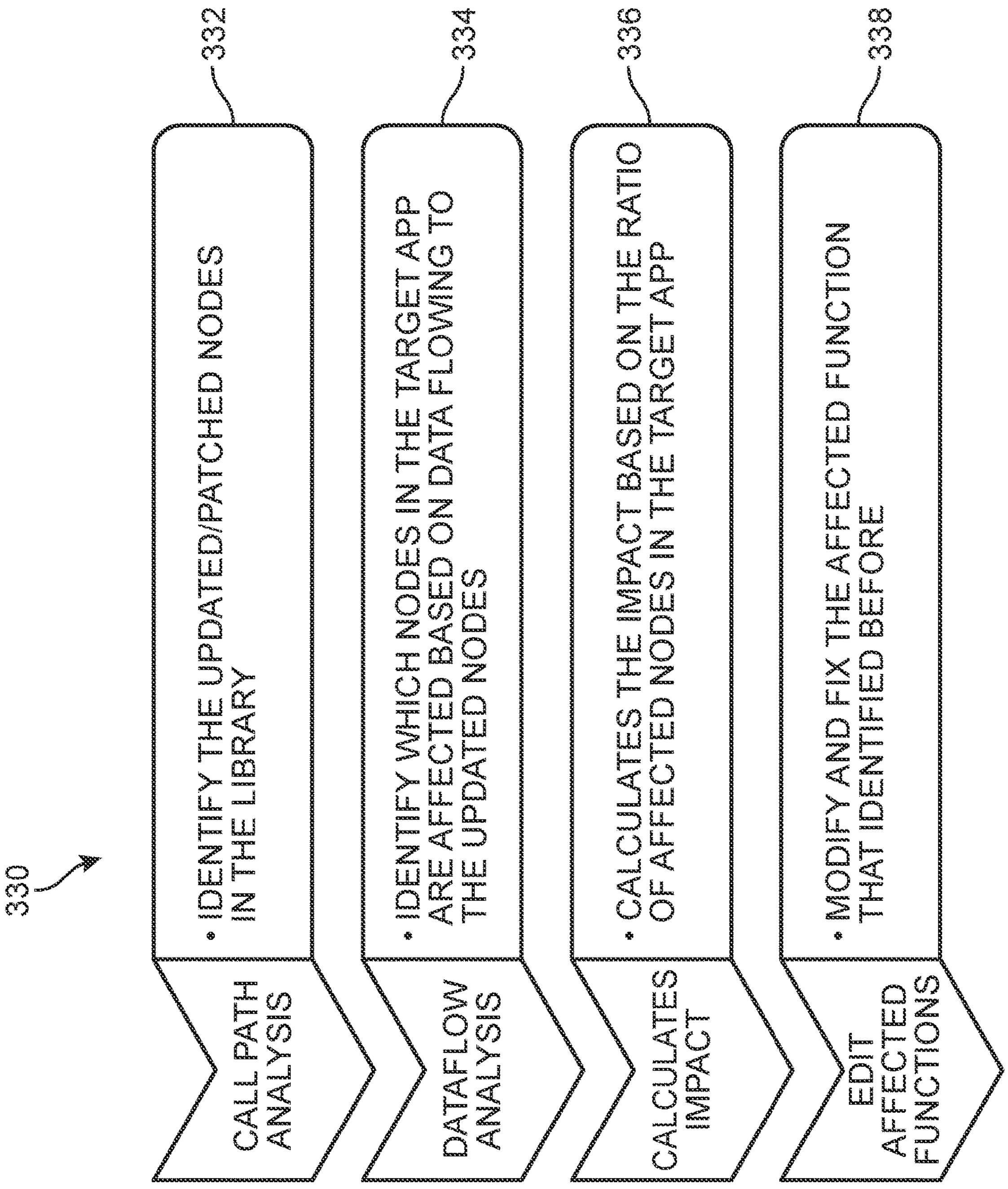
FIG. 3B is a diagram of an improved approach for impact analysis, according to an embodiment.

For purposes of clarity, FIG. 3A presents a first diagram 310 of an alternative (conventional) approach that has been employed for impact analysis. In contrast, FIG. 3B depicts a second diagram 330 showing how an impact analysis process incorporating an embodiment of the disclosed systems can be more expeditiously and effectively performed. As shown in FIG. 3A, in the traditional alternative impact analysis, the user creates a testing branch at operation 312. Then, the alternative impact analysis continues by building an application at operation 314, running testing at operation 316, identifying errors at operation 318, fixing found errors at operation 320, and returning to building the application at operation 314. In other words, this approach requires a repeated, iterative cycle for conducting impact analyses, across an extended duration over which only some of the vulnerabilities may be identified. In addition, many of these steps must be performed manually. Accordingly, the alternative impact analysis approach shown in FIG. 3A is relatively labor-intensive, inefficient, and slow.

By contrast, the present embodiments provide a substantially improved approach to impact analysis. As shown in second diagram 330, the method begins with an operation 332, in which call path analysis occurs. Specifically, the method identifies the updated/patched nodes in the library during the operation 332. In operation 334, dataflow analysis occurs. Specifically, the method identifies affected functions/object in the target application based on dataflow during operation 334. In other words, operation 334 can include an automated identification of which nodes in the target application are affected, based on data flowing to the updated nodes.

Furthermore, at an operation 336, the method calculates impact. Specifically, the method calculates impact based on a graph of affected nodes in the target application during operation 336. In one example, the impact is based on the ratio of affected nodes in the target application to unaffected nodes. In an operation 338, the method causes edits of the affected functions. More specifically, the method includes modifying and fixing that affected functions that were identified previously.

Figure 4:
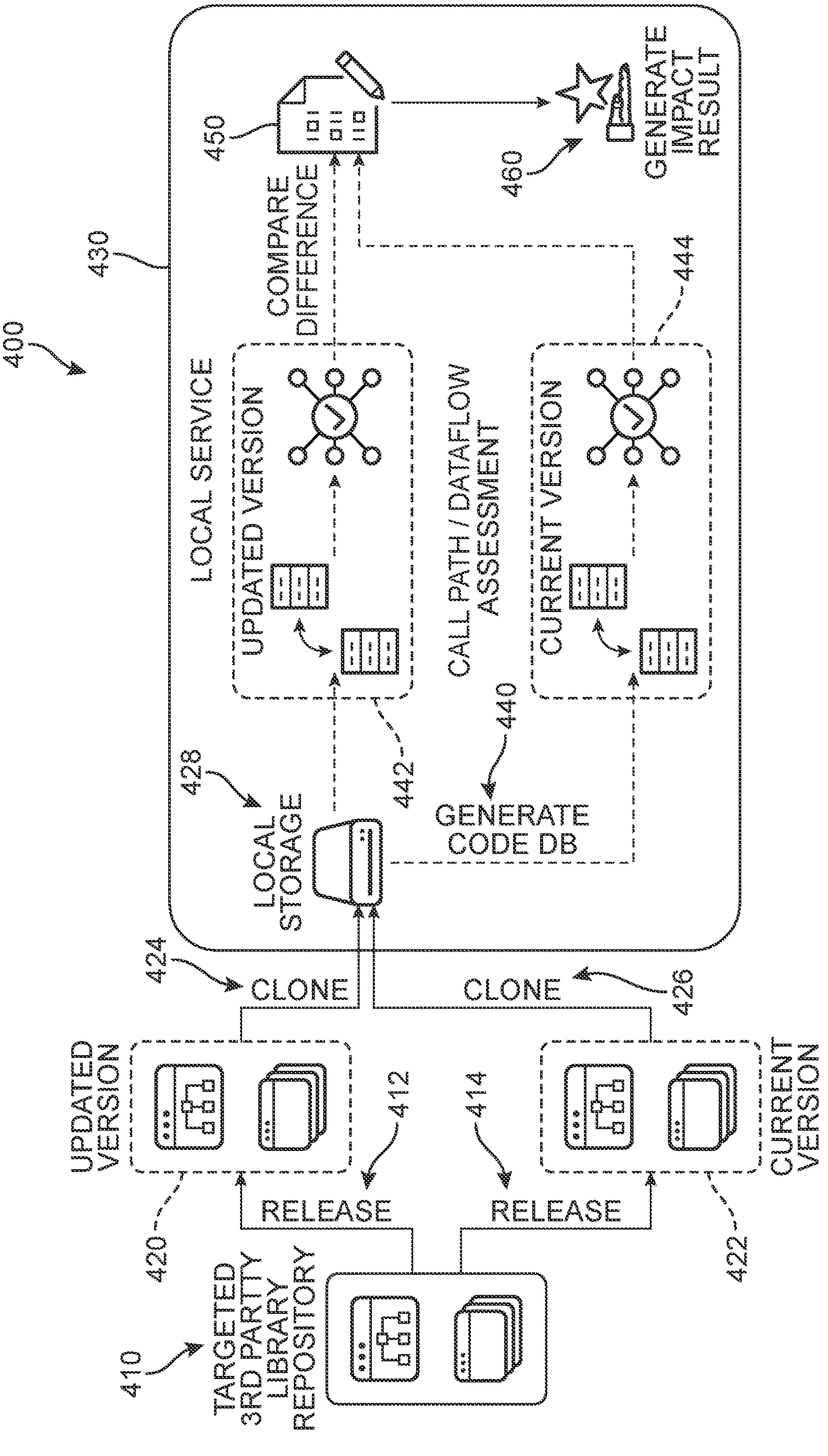
FIG. 4 is a diagram depicting a technical architecture of a system for impact analysis, according to an embodiment.

Additional details with respect to how operations 332 and 334 are performed are provided below--for example, FIG. 4 presents an architecture as to how these operations are performed, while FIG. 6 offers details of how a code analysis engine may query the code database to provide information for an alert. As a general matter, the implementation of the method shown in FIG. 3B enables impact assessments of affected functions to occur in a very short period of time (which could be as little as one hour). The functions that need to be updated are thereby identified quickly and efficiently. Thus, the method represented by second diagram 330 includes an automated performance of operation 332, operation 334, and operation 336. While the fixing and modifying of the functions in operation 338 includes some manual intervention, the system can nevertheless generate and output information that may be helpful during operation 338. For example, at one or more of operation 332, operation 334, and operation 336, the system may identify the functions that should be targeted for remediation by the end-user, which can significantly expedite the process of completing a successful upgrade of a third-party library or identifying and fixing vulnerabilities in a third-party library (which occur in operation 338).

FIG. 4 is a diagram of a technical architecture of a system 400 for impact analysis, according to an embodiment. In different embodiments, the system 400 can include provisions for determining how updates will affect a targeted third-party library. As shown in FIG. 4, one route through system 400 can begin at a targeted third-party library repository 410. The targeted third-party library repository can be: (a) released in operation 412 as an updated version 420 and (b) released in operation 414 as a current version 422. In different embodiments, the updated version 420 includes changes to code from a subsequent release or a patched version while the current version 422 is unmodified.

In some embodiments, each of updated version 420 and current version 422 is cloned into a local storage 428 of a local service 430. For example, updated version 420 is cloned at operation 424, and current version 422 is cloned at operation 426. In one embodiment, the local storage 428 performs an operation 440 including: (a) generating a code database for updated version 442 and (b) generating a code database for the current version 444. The updated version 442 can be automatically associated with or assigned to a corresponding call path/dataflow assessment. The current version 444 can also be associated with or assigned to a corresponding call path/dataflow assessment.

In different embodiments, at operation 450, the local service 430 can compare/detect the differences between the updated version 442 and the current version 444. As part of this step, the differences between the updated version 442 and the current version 444 are also categorized or classified as either "no impact" differences and "impact" (or "impactful") differences. For example, "no impact" or "non-impactful" differences could include comment modifications, space or change-line modifications, or variable name modifications. Such modifications would be deemed non-substantive. On the other hand, "impact" differences could include changes where a function/class is removed, method invocation changes, method parameters change, or control logic change, or other substantive modifications, as non-limiting examples.

Figure 5:
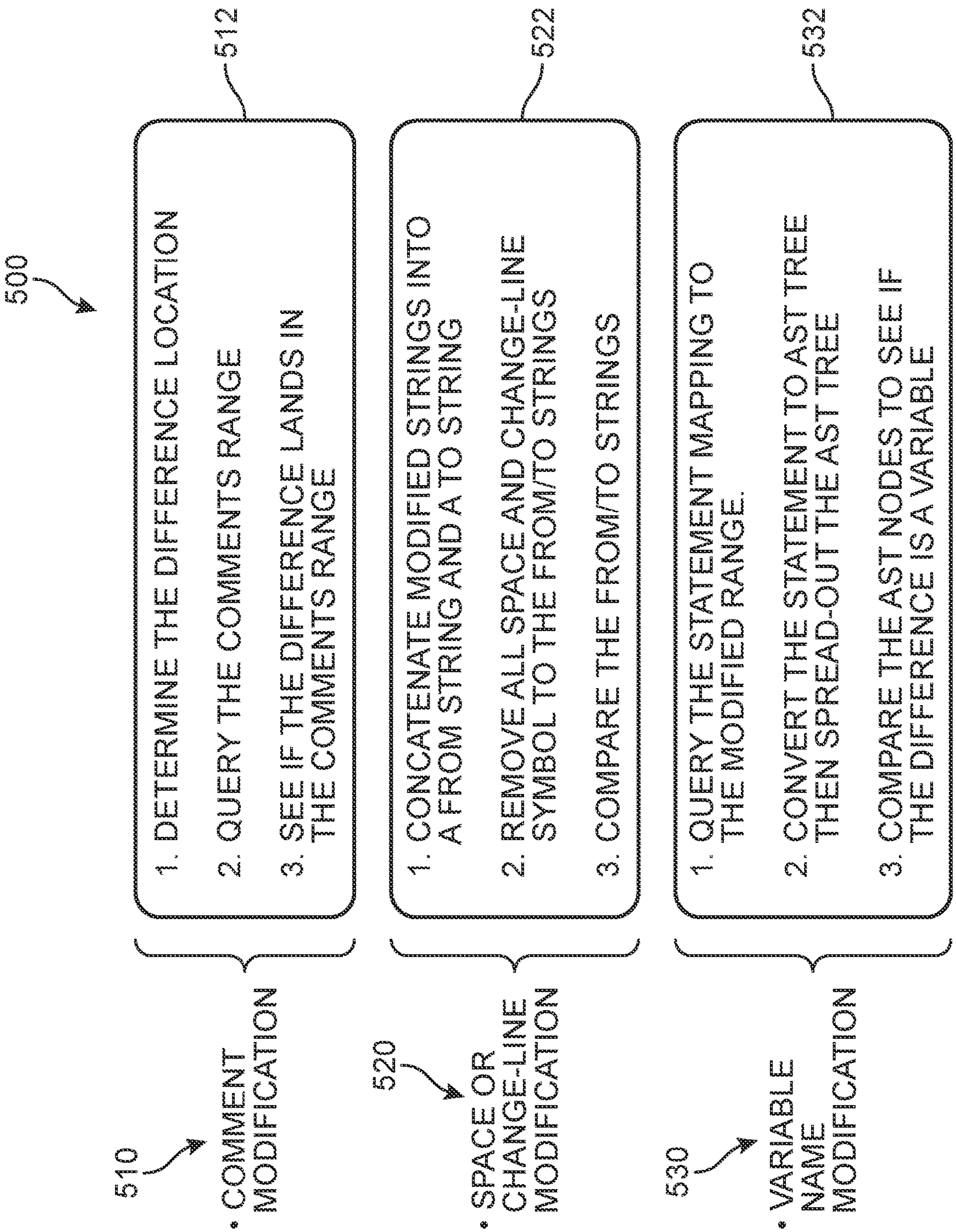
FIG. 5 is a diagram presenting examples of modifications that can be classified as non-substantive or no-impact, according to an embodiment.

In general, certain scripts or other programs can identify/filter changes that are "no impact" and isolate them from the other changes for purposes of classifying the two groups. For example, referring briefly to FIG. 5, some examples of substantive, impact differences 500 are presented, along with possible techniques by which they may be detected. A first impact-type difference 510 includes comment modifications. A first script approach 512 to identify or detect comment modifications can include steps of: (a) determining the difference location, (b) querying the comments range, and (c) determining if the difference falls within a range designated for comments. In addition, a second impact-type difference 520 includes space or change-line modifications. A second script approach 522 to identify or detect space or change-line modifications can include steps of: (a) concatenating modified strings into a "From String" and a "To String", (b) removing all space symbols and change-line symbols from the two strings (i.e., from the From Strings and To Strings), and (c) comparing the From Strings with the To Strings. A third impact-type difference 530 includes variable name modifications. A third script approach 532 to identify or detect variable name modifications can include steps of: (a) querying the statement mapping to the modified range, (b) converting the statement to the abstract syntax tree (AST), then spreading out the AST, and (c) comparing the AST nodes to see if the difference is a variable. In other words, with this approach, only comment modifications, space or change-line modifications, or variable name modifications would be considered by the system to represent "no impact" differences, while all other changes that are detected by the system can be assumed by the system to comprise "impact" differences.

Returning now to FIG. 4, in different embodiments, the output label of this difference comparison process performed at operation 450 can then be used to generate an impact result 460. The impact result 460 could take on a number of forms. In some embodiments, the impact result 460 could describe a percentage, or fraction, of impacted functions in the code. In another example, the impact result 460 could also identify particular impacted functions. In one embodiment, the impact result 460 could also provide additional information about how the impacted functions are affected. In different embodiments, the impact result 460 could also include a graphical portrayal of information about nodes corresponding to a third-party library. For example, an automated impact assessment can be represented as a plurality of call paths extending between vulnerable versions and fixed versions of the affected components. In one example, the system can generate a first call path assessment graph that includes nodes connected by edges for an original version which is transformed into a second call path assessment graph after changes have been implemented. For example, the transformation may be a transformation in which a package is upgraded. Alternatively, the transformation may be a transformation in which vulnerabilities are identified. The vulnerabilities are found by identifying which functions have changed from vulnerable to fixed or patched functions. Thus, the second graph can clearly illustrate functions that have undergone a change. In one example, the second graph corresponds to a target application assessment, including information about particular nodes corresponding to impacted functions. As another example, a zoom-in of the graph by a user can cause the system to isolate and display a selection of one or more impacted functions, representing those function(s) that were upgraded during a package upgrade installation, or a function that was patched or otherwise fixed as vulnerabilities were repaired. In some embodiments, these graphs depict dataflows and invocation analysis that were used to find the usage of vulnerable 3rd packages, and can illustrate the custom impact depending on the usage.

Figure 6:
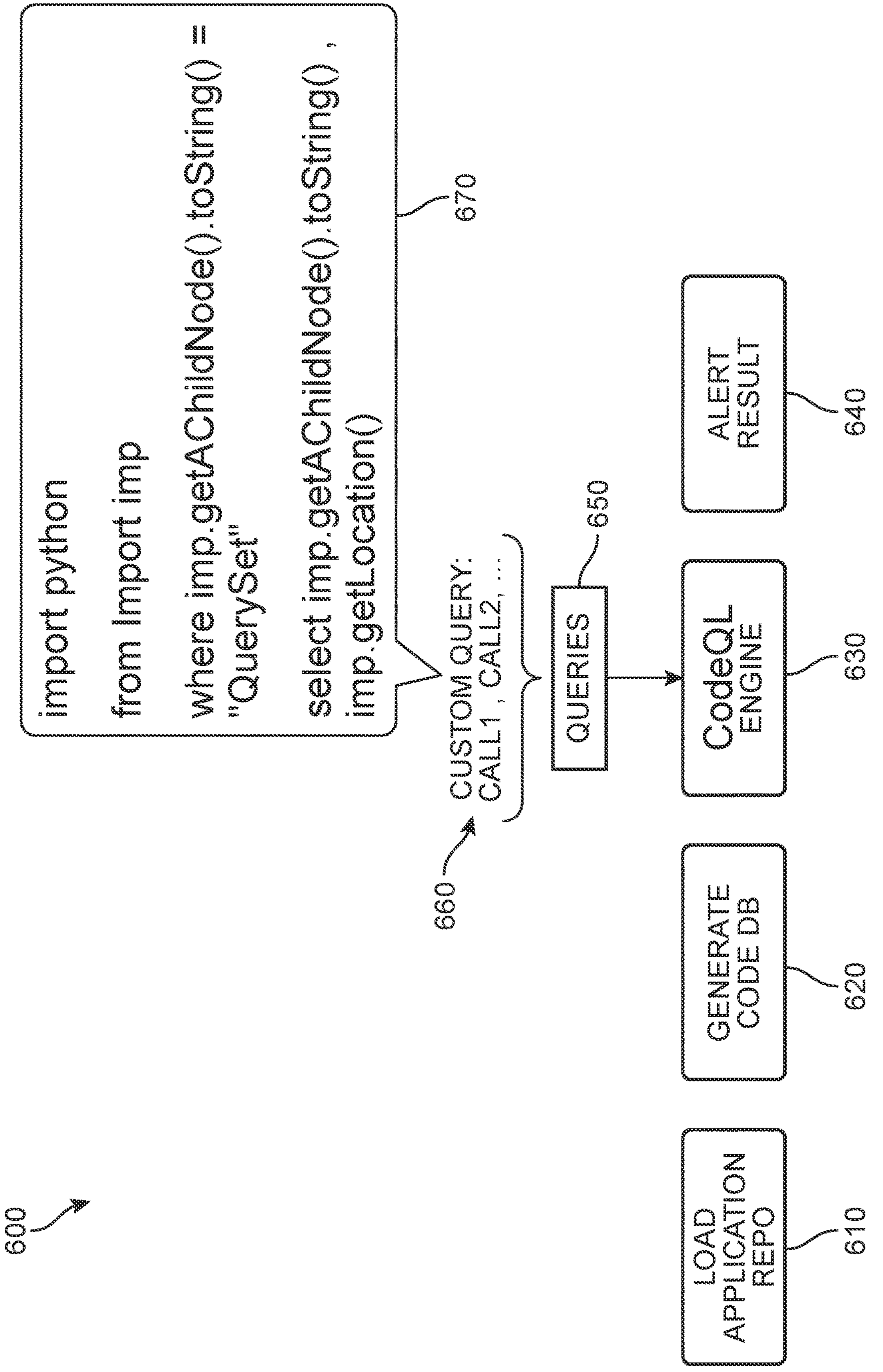
FIG. 6 is a diagram depicting an approach for code analysis, according to an embodiment.

FIG. 6 is a diagram of an approach for code analysis, according to an embodiment. The code analysis may be performed using a code analysis tool provided by the proposed systems. For example, the code analysis tool may query coding information using a querying language that is similar to Structured Query Language (SQL). As shown in FIG. 6, in some embodiments, the code analysis tool can load an application repository 610. Then code analysis tool can then generate a code database 620. In addition, the code analysis tool may then employ a code querying (codeQL) engine 630 that receives queries 650 executed with respect to the generated code database. A codeQL analysis can include steps of: (a) preparing the code, by creating a codeQL database, (b) running codeQL queries against the database, and (c) interpreting the query results.

In different embodiments, these queries 650 can for example include custom queries 660 targeting a particular purpose. In some embodiments, the queries 650 may correspond to function calls or may correspond to vulnerabilities. In performing the queries 650, the code querying engine 630 may be able to assess differences based on the results of the queries 650. For purposes of clarity to the reader, a non-limiting example of code that can be used for the queries 650 is shown as code 670.

For example, in an embodiment in which a goal of the system is to determine the effects of an update on a function, the queries 650 may be queries to find callable nodes. The system may also include a build call path analysis that defines callers and callees and queries all invocations between them. In some embodiments, there may also be a dataflow analysis, which defines the data to trace, and then queries all nodes that touch the data. In another embodiment where a goal of the system is to track vulnerabilities, the queries 650 are performed to allow developers to track the differential code and functions in the application dataflow. Custom queries 660 for the code analysis tool can find affected functions and objects in the application dataflow. The code analysis tool may also provide a code analysis engine 630 that can automate security checks.

In either of these cases, once the code analysis tool has employed the code analysis engine 630 to execute the queries 650, the code analysis engine 630 can produce an alert result 640. In different embodiments, an alert result 640 can offer useful and/or critical information to a user. In particular, in one case, the alert result 640 may establish which functions in a package would be impacted by an upgrade. Accordingly, the alert result 640 may indicate a degree of change/difference as well as guide a user about how to more effectively target their efforts. In another case, the alert result 640 may establish which functions in a package are vulnerable, guiding a user toward specific remediation techniques and tools for fixing the identified vulnerabilities. As noted above, there may also be a graphical depiction of results.

Figure 7:
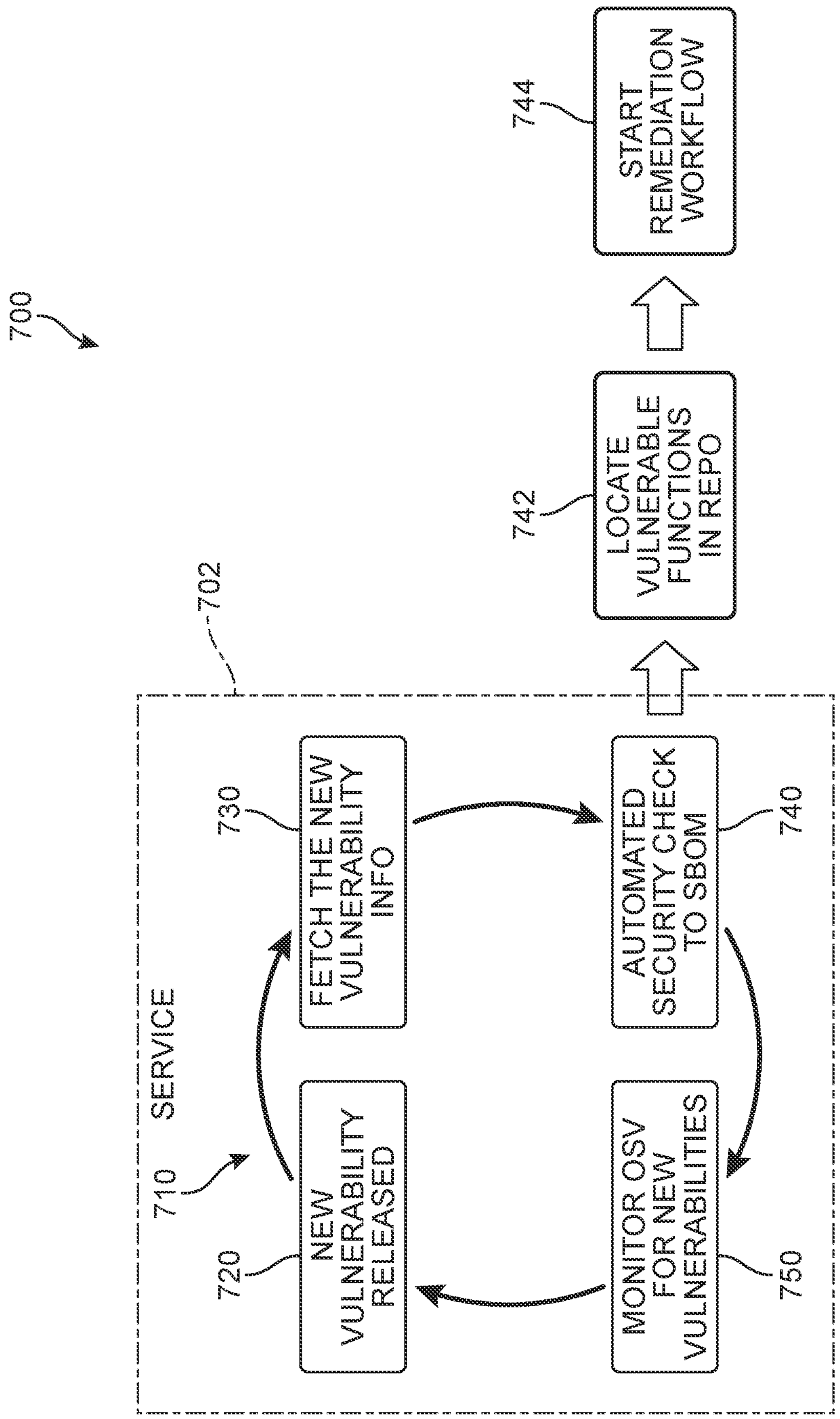
FIG. 7 is a schematic diagram of a lifecycle for monitoring potential impacts on an application based on updated code in a code repository, according to an embodiment.

In order to allow for a better appreciation of the proposed embodiments, FIG. 7 a schematic diagram 700 presents a detection lifecycle 710 reflecting the significantly faster and more efficient approach to managing vulnerabilities in an application. As shown in FIG. 7, a monitoring service 702 can actively monitor a vulnerability database in real-time or near-real-time over a narrow duration window (e.g., an hour or less) and identify and isolate newly released vulnerabilities. In some embodiments, an automated security check can be performed by the service 702 in approximately ten minutes. In different embodiments, the lifecycle 710 can include a first stage 720 at which a new vulnerability is released at the vulnerability database. In a second stage 730, the service 702 can fetch/retrieve the new vulnerability information from the database. In a third stage 740, the service 702 can initiate/trigger an automated security check with the SBOM for detection of a vulnerable package, including locating vulnerable functions in the repository (substep 742) and performing a remediation workflow (substep 744). In one example, locating vulnerable functions includes location and identification of both the affected function and the parent affected function (in the case of nested functions). Finally, in a fourth stage 750, the service 702 continues to monitor open-source vulnerability (OSV) at the database for new vulnerabilities, with the lifecycle 710 repeating as a continuous process.

Figure 8:
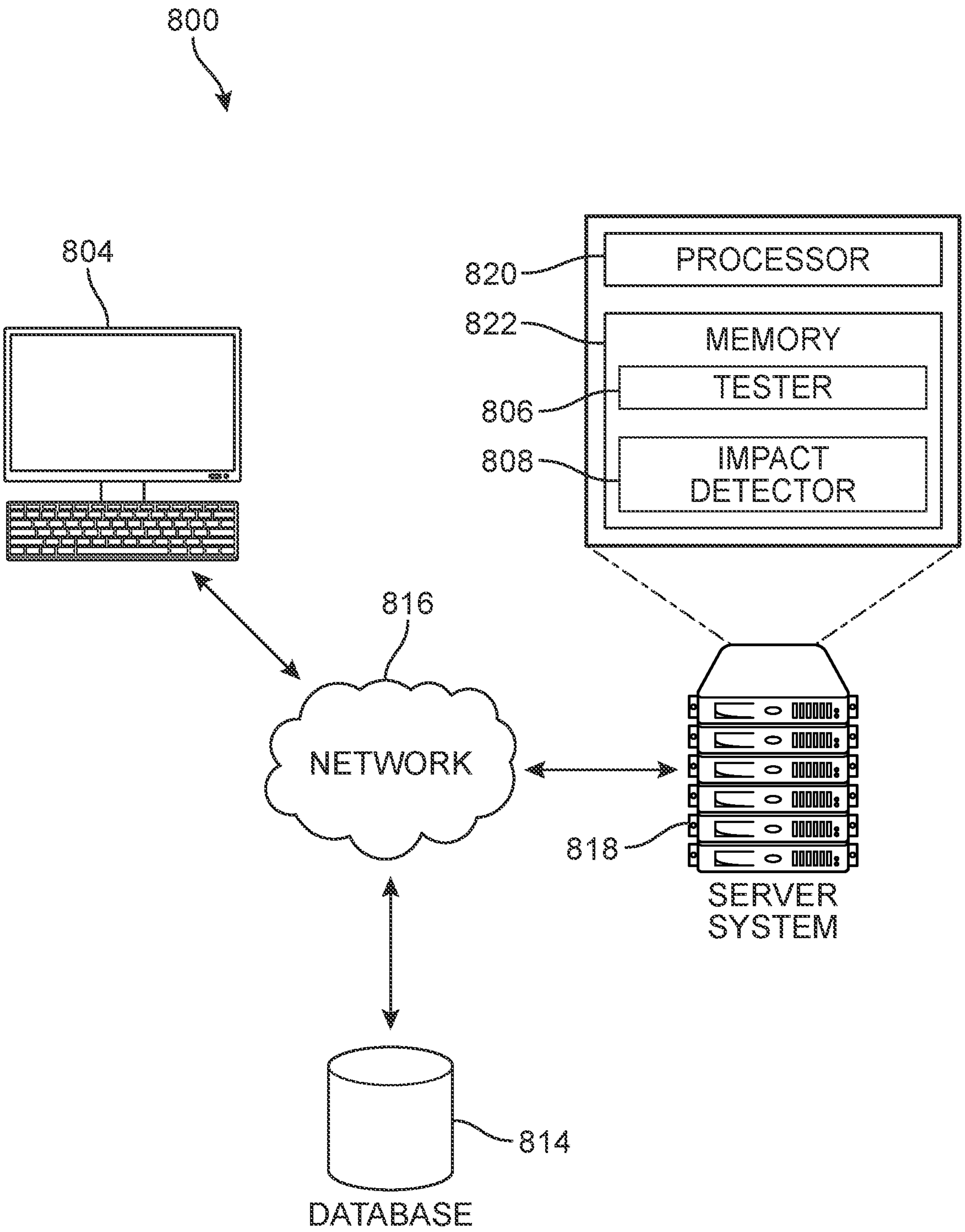
FIG. 8 is a diagram depicting example environments and components by which systems and/or methods, described herein, may be implemented.

FIG. 8 is a schematic diagram of a system for detecting impact based on updated code in a code repository 800 (or system 800), according to an embodiment. Such an impact detection tool/approach may be used when upgrading the code repository or tracking vulnerabilities and fixes for the code repository. System 800 may include a user and user device 804 (or device 804). During use, a user may interact with the system 800 to identify which functions are impacted when a third-party library is updated. The information about which functions are impacted can provide information to the user. Such information may be useful when upgrading a library. The impact information may also be useful when determining which functions are being patched when vulnerabilities are fixed in a third-party library.

The disclosed system 800 may include a plurality of components capable of performing the disclosed computer implemented method. For example, system 800 may include a user device 804, a computing system 818, and a database 814. Database 814 may store information about one or more code repositories associated with third-party libraries. For example, database 814 may store databases containing one or more code repositories as well as properties and metadata for the code repositories. In another example, database 814 may store files including information about one or more files including source code for the code repositories.

The components of system 800 can communicate with each other through a communication network 816. For example, user device 804 may retrieve information about a third-party library repository from database 814 via communication network 816. In some embodiments, communication network 816 may be a wide area network ("WAN"), e.g., the Internet. In other embodiments, communication network 816 may be a local area network ("LAN").

While FIG. 8 shows one user device 804, it is understood that one or more user devices 804 may be used. For example, in some embodiments, the system 800 may include two or three user devices 804. In some embodiments, the user devices 804 may be computing devices used by a user. For example, user device 804 may include a smartphone or a tablet computer. In other examples, user device 804 may include a laptop computer, a desktop computer, and/or another type of computing device. The user devices 804 may be used for inputting, processing, and displaying information. The user device 804 may include a display that provides an interface for the user to input and/or view information.

For example, the user device 804 may instruct the computing system 818 to perform various operations to assess the impact of an upgrade or a vulnerability repair on a third-party library. Once the computing system 818 has assessed the impact, the computing system 818 may provide results to the user device 804. These results may be a metric expressing the extent to which the changes affect the third-party library. Alternatively, the results may include information about which specific functions in the third-party are affected by the changes. The information about specific functions will help the user of the user device 804 target efforts when implementing the changes.

As shown in FIG. 8, in some embodiments, a tester 806 and an impact detector 808 may be hosted in the computing system 818. Generally, tester 806 can clone a third-party library for testing purposes and use the cloned results to generate updated and current versions. The tester 806 can take the cloned results and perform testing to ascertain the effects of the changes on the versions. Impact detector 808 can use the information provided by tester 806 to find differences between the updated and current versions. Impact detector 808 can then use these differences to identify the relevant information to be provided to the user at the user device 804.

Computing system 818 includes a processor 820 and a memory 822. Processor 820 may include a single device processor located on a single device, or the processor 820 may include multiple device processors located on one or more physical devices. Memory 822 may include any type of storage, which may be physically located on one physical device, or on multiple physical devices. In some cases, computing system 818 may comprise one or more servers that are used to host the system. The processor 820 and the memory 822 may implement the tester 806 and the impact detector 808 to gather appropriate results to send to the user device 804.

In different embodiments, embodiments may include a third-party library that is to be upgraded or a third-party library in which potential vulnerabilities are to be identified and fixed or patched. There may be a goal to efficiently establish where upgrading or patching an affected library will have an impact. For example, there may be a storage including a library, and the information in the library may be submitted to a tester and to an impact detector. These modules are able to identify which portions of code have changes that would have an impact, and which portions of code have changes that would not be considered to have an impact.

Once the code having an impact is identified, the impact detector can further determine which particular functions would be affected by the transformation. This determination can yield information about how much impact would occur. The determination also clarifies where the impact will occur, which can serve as a guide when ensuring that an upgrade or a vulnerability patch can proceed successfully. Accordingly, the disclosed approaches automate tasks that would otherwise need to be performed manually. By such automation, time, money, and effort can be saved as the user can be forewarned in advance as to whether a third-party update will likely/potentially lead to a vulnerability in their software application, and where they would best focus their efforts proactively. Accordingly, the disclosed approaches provide a technical solution that improves the ability of a system to solve problems that arise when determining what to do when making changes to a third-party library repository.

Figure 9:
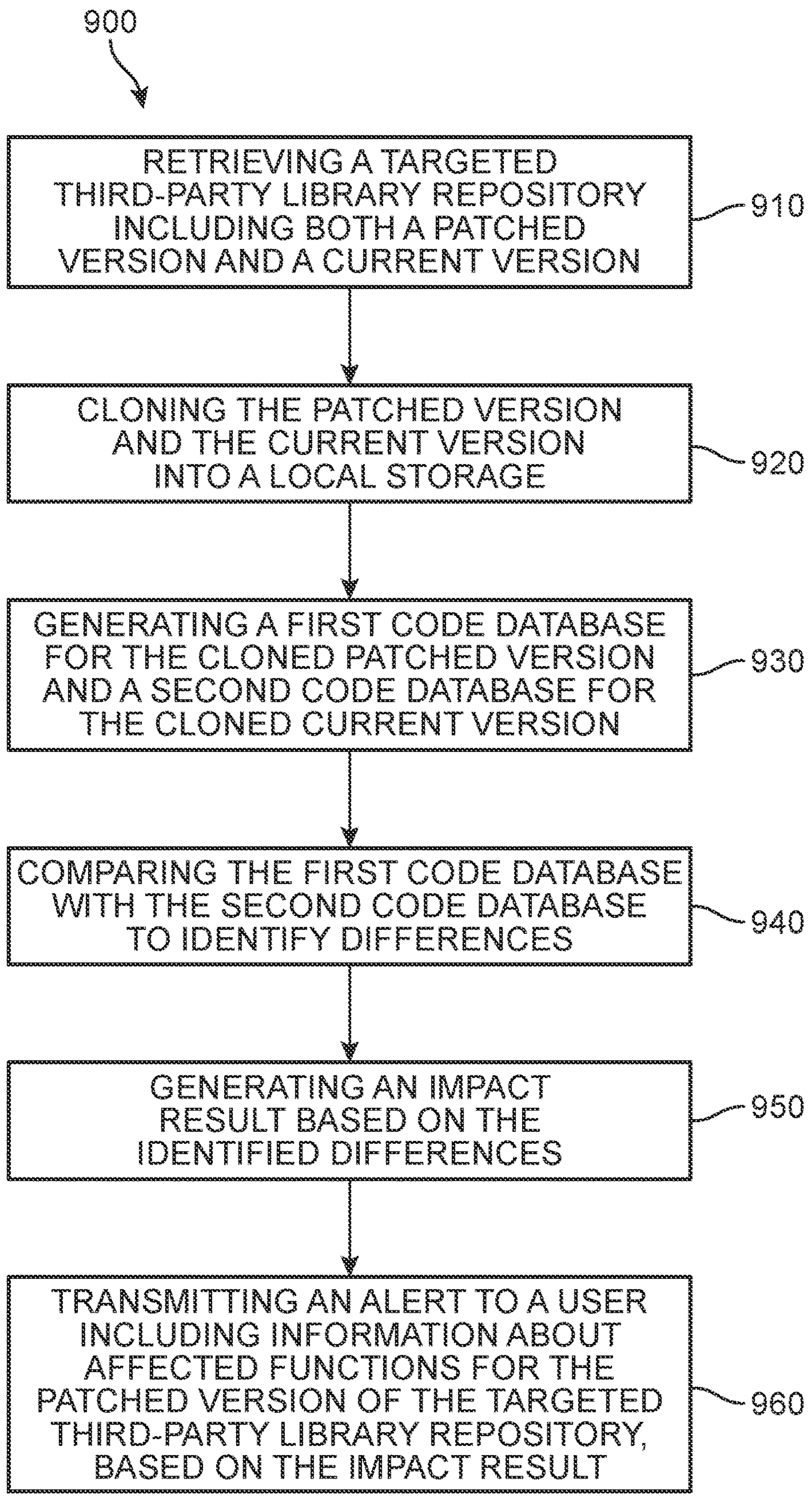
FIG. 9 is a flow chart depicting a process of performing automated, tailored vulnerability impact assessments, according to an embodiment.

Thus, the proposed embodiments offer a more rapid vulnerability assessment compared to conventional techniques. For example, the disclosed systems incorporate a new integrated workflow that can automatically (a) monitor OSV database(s) to retrieve newly posted vulnerabilities faster, (b) combine Syft and OSV API to discover the vulnerabilities with CVE numbers in the dependency and applicable functions, (c) combine Syft and CodeQL to detect the vulnerable package import and code function location, and (d) use differential code snippets and CodeQL to analyze the dataflow and call path difference and evaluate the impact of vulnerability fix on application workflow. This approach significantly improves vulnerability detection, where the average time to identify newly posted SBOM vulnerabilities and generate alerts can be less than an hour, while also providing users with a custom vulnerability impact assessment for their applications. For example, in one test, the proposed system fetched the vulnerability within 3 hours of the update, while in contrast a conventionally available tool took approximately 2 weeks to update FIG. 9 is a flow chart illustrating an embodiment of a method 900 of performing automated, tailored vulnerability impact assessments. The method 900 includes a first step 910 of retrieving a targeted third-party library repository including both a patched version and a current version, and a second step 920 of cloning the patched version and the current version into a local storage. A third step 930 includes generating a first code database for the cloned patched version and a second code database for the cloned current version, and a fourth step 940 includes comparing the first code database with the second code database to identify differences. In addition, a fifth step 950 includes generating an impact result based on the identified differences, and a sixth step 960 includes transmitting an alert to a user including information about affected functions for the patched version of the targeted third-party library repository, based on the impact result.

In other embodiments, the method may include additional steps or aspects. In some embodiments, the patched version includes modifications made to the current version. In another example, the method also includes separating the identified differences into a first group that includes those identified differences involving one or more of a comment modification, change-line modification, and variable name modification, and a second group including any identified differences that are unassigned to the first group. In some embodiments, the method also includes classifying each of the differences in the first group as non-substantive or no impact. In one embodiment, the method also includes classifying each of the differences in the second group as substantive or impact. In some embodiments, differences classified as substantive include differences based on a removal of a function or class, changes in parameters, or control logic changes. In one example, the impact result is further based on the classification of each difference as either substantive or non-substantive. In another example, the method includes providing a user interface that allows an end-user to manage upgrades of the affected functions based on the impact result.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid-state disk), a compact disc (CD), a digital versatile disc (DVD), a floppy disk, a cartridge, and/or a magnetic tape.

Embodiments may also include one or more computers and one or more storage devices storing instructions that are operable, when executed by the one or more computers, to cause the one or more computers to perform the disclosed methods.

Certain embodiments may use cloud computing environments. Cloud computing environments can include, for example, an environment that hosts the services for impact analysis and detection described herein. The cloud computing environment may provide computation, software, data access, storage, etc. services that do not require end-user knowledge of a physical location and configuration of system(s) and/or device(s) that hosts the impact analysis and detection services. For example, a cloud computing environment may include a group of computing resources (referred to collectively as "computing resources" and individually as "computing resource").

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of performing automated, tailored vulnerability impact assessments, the method comprising:
- retrieving a targeted third-party library repository including both a patched version and a current version;
- cloning the patched version of the targeted third-party library repository and the current version of the targeted third-party library repository into a local storage;
- generating a first code database for the cloned patched version related to the targeted third- party library repository and a second code database for the cloned current version related to the targeted third-party library repository;
- comparing the first code database with the second code database to identify differences;
- separating the identified differences into a first group that includes one or more of the identified differences involving one or more of a comment modification, change-line modification, and variable name modification, and a second group including one or more of the identified differences that are unassigned to the first group, further comprising:
  - classifying the differences in the first group as non-substantive or no impact, and
  - classifying the differences in the second group as substantive or impact, wherein the differences classified as substantive include differences based on one or more of a removal of a function or class, changes in parameters, or control logic changes;
- generating an impact result based on the identified differences; and
- transmitting an alert to a user including information about affected functions for the patched version of the targeted third-party library repository, based on the impact result.

2. The method of claim 1, wherein the patched version includes modifications made to the current version.

3. The method of claim 1, wherein the impact result is further based on the classification of each difference as either substantive or non-substantive.

4. The method of claim 1, further comprising providing a user interface that allows an end-user to manage upgrades of the affected functions based on the impact result.

5. A non-transitory computer-readable medium storing software comprising instructions executable by one or more computers which, upon such execution, cause the one or more computers to perform automated, tailored vulnerability impact assessments by:
- retrieving a targeted third-party library repository including both a patched version and a current version;
- cloning the patched version of the targeted third-party library repository and the current version of the targeted third-party library repository into a local storage;

generating a first code database for the cloned patched version related to the targeted third-party library repository and a second code database for the cloned current version related to the targeted third-party library repository;

comparing the first code database with the second code database to identify differences;

separating the identified differences into a first group that includes one or more of the identified differences involving one or more of a comment modification, change-line modification. and variable name modification, and a second group including one or more of the identified differences that are unassigned to the first group, further comprising:

classifying the differences in the first group as non-substantive or no impact, and classifying the differences in the second group as substantive or impact, wherein the differences classified as substantive include differences based on a removal of a function or class, changes in parameters, or control logic changes;

generating an impact result based on the identified differences; and transmitting an alert to a user including information about affected functions for the patched version of the targeted third-party library repository, based on the impact result.

6. The non-transitory computer-readable medium of claim 5, wherein the patched version includes modifications made to the current version.

7. A system for performing automated, tailored vulnerability impact assessments comprising one or more computers and one or more storage devices storing instructions that are operable, when executed by the one or more computers, to cause the one or more computers to:

retrieve a targeted third-party library repository including both a patched version and a current version;

clone the patched version of the targeted third-party library repository and the current version of the targeted third-party library repository into a local storage;

generate a first code database for the cloned patched version related to the targeted third-party library repository and a second code database for the cloned current version related to the targeted third-party library repository;

compare the first code database with the second code database to identify differences;

separate the identified differences into a first group that includes one or more of the identified differences involving one or more of a comment modification, change-line modification, and variable name modification, and a second group including one or more of the identified differences that are unassigned to the first group, further comprises to:

classify the differences in the first group as non-substantive or no impact, and classify the differences in the second group as substantive or impact, wherein the differences classified as substantive include differences based on a removal of a function or class, changes in parameters, or control logic changes;

generate an impact result based on the identified differences; and transmit an alert to a user including information about affected functions for the patched version of the targeted third-party library repository, based on the impact result.

8. The system of claim 7, wherein the impact result is further based on the classification of each difference as either substantive or non-substantive.

9. The system of claim 7, wherein the instructions further cause the one or more computers to provide a user interface that allows an end-user to manage upgrades of the affected functions based on the impact result.

10. The system of claim 7, wherein the patched version includes modifications made to the current version.

* * * * *